United States Patent [19]

Neser

[11] 4,338,374

[45] Jul. 6, 1982

[54] FIREPROOF MATERIAL

[75] Inventor: Rudolf P. Neser, Ludwigshafen am Rhein, Fed. Rep. of Germany

[73] Assignee: Woellner-Werke, Rhein, Fed. Rep. of Germany

[21] Appl. No.: 217,918

[22] Filed: Dec. 18, 1980

Related U.S. Application Data

[62] Division of Ser. No. 77,768, Sep. 21, 1979, abandoned.

[30] Foreign Application Priority Data

Sep. 25, 1978 [DE] Fed. Rep. of Germany ....... 2841623

[51] Int. Cl.$^3$ .......................... B32B 9/04; C09D 1/02; C09D 5/18; C09K 3/28
[52] U.S. Cl. .................................... 428/411; 428/452; 428/453; 106/18.12; 106/18.13; 106/18.21; 106/74; 106/80; 252/607; 427/397.8
[58] Field of Search ................. 106/18.12, 38.3, 38.35, 106/74, 80, 18.13, 18.21; 252/8.1, 607; 427/397.8; 428/411, 452, 453

[56] References Cited

U.S. PATENT DOCUMENTS

| | | | |
|---|---|---|---|
| 2,829,060 | 4/1958 | Emblem et al. .................. | 106/38.35 |
| 2,905,563 | 9/1959 | Ilenda et al. ...................... | 106/38.35 |
| 2,926,098 | 2/1960 | Ilenda et al. ...................... | 106/38.35 |
| 2,952,553 | 9/1960 | Ilenda et al. ....................... | 106/38.3 |
| 3,663,355 | 5/1972 | Shimizu et al. ................. | 427/408 X |
| 4,179,535 | 12/1979 | Kalbskopf et al. ................. | 427/206 |

FOREIGN PATENT DOCUMENTS 2022572 11/1970 Fed. Rep. of Germany.
2725779 12/1977 Fed. Rep. of Germany.

*Primary Examiner*—Michael R. Lusignan
*Attorney, Agent, or Firm*—Browdy and Neimark

[57] ABSTRACT

A fireproofing material for application to flammable surfaces is based on an alkali metal silicate solution containing a non-ionic surfactant in combination with an alkali metal tri-silicate powder. The composition according to the invention is easily applicable to plane surfaces with ordinary tools, for example, spatulas, yet will not run either when applied or when subjected to flame.

25 Claims, No Drawings

FIREPROOF MATERIAL

This is a division of application Ser. No. 77,768 filed Sept. 21, 1979, now abandoned.

FIELD OF THE INVENTION

The invention relates to materials for coating flammable objects to impart thereto protection against damage by flame or fire.

BACKGROUND OF THE INVENTION

U.S. Pat. No. 3,663,355 describes a fire protected board of a flammable material on which there is placed a fire protective coating which consists of a water-soluble silicate, for example sodium or potassium silicate, which foams when subjected to high heat. This layer is then covered with a second layer consisting of a waterproof material. In the board described in this patent, the base consisting of flammable material is covered with a first layer of waterproof material which supports the foam-generating layer on which then resides the second layer of waterproof material. The waterproof material is obtained by adding a substance, for example dicalcium silicate, to the water-soluble silicate, thereby generating a self-curing mixture. The purpose of the known waterproof plate described above is to retain its fireproof properties even under severe environmental conditions over long periods of time due to the layer construction in which the foam-generating layer is protected against environmental conditions prior to the occurrence of an actual fire.

U.S. Pat. No. 4,179,535 describes a self-hardening compound based on sodium silicates for coating substrates with a fire-retardant layer which swells up in case of a fire but solidifies again without flowing away. This compound is an aqueous solution of water-soluble silicates up to between 40 and 80% by weight as well as 20–60 weight % of hydrated silicate particles and 15–20% water. The molar ratio of $SiO_2$ to $Na_2O$ in both silicates should be between 2 and 3.5.

The fire resistant plate described in U.S. Pat. No. 3,663,355 affords good flame protection but it is difficult to manufacture and cannot be used in all applications due to its relatively complicated type of construction.

The protective layer described in the U.S. Pat. No. 4,179,535 has been found in tests to be impossible to produce without the addition of a protective gas (20–60% by weight) unless it includes a ratio of water glass to silicate particles of 50:50. However, such a ratio makes it difficult to apply the material, for example by means of a spatula.

OBJECT AND SUMMARY OF THE INVENTION

It is a principal object of the present invention to provide a fireproof coating which overcomes the aforementioned disadvantages of the prior art, i.e., there is no necessity to provide a number of different layers of the fireproof material and it is practical and easy to apply with normal tools.

This object is attained according to the present invention by providing a fire-protective coating with a binding material which consists of the combination of an alkali metal silicate solution and an alkali metal trisilicate powder, the alkali metal silicate solution containing a non-ionic tenside soluble in water glass. This compound according to the invention has excellent fire resistive properties and excellent workability; for example, it may be readily applied by means of a spatula.

Preferably, the alkali metal silicate solution is a solution of an alkali metal silicate having a component ratio $Me_2O:SiO_2$ of 1:2.8–3.5. The alkali metal silicate solution may preferably be a sodium silicate solution or a mixture of sodium and potassium silicate solutions.

The fire-protective properties of the compound may be further increased by the addition of one or more additives, for example urea, hexamethylene-tetramine, borax, phosphate, dicyandiamide and/or sugar or similar substances, especially up to 10 weight % and particularly between 0.5–7 weight %.

The alkali metal trisilicate powder is preferably sodium trisilicate with a component ratio $Me_2O:SiO_2$ of 1:2.8–3.5. The amount of alkali metal trisilicate powder in the alkali silicate solution is preferably 25–70 weight %, and in particular 40–60 weight %.

The tenside according to the invention improves the workability of the compound and lengthens the time during which the material may be applied, all within wide limits of the solid silicate concentration. The tenside is added preferably in quantities of between 0.05–0.8 weight % of the total mass. Tensides which may be used are for example alkyl glucoside, for example Triton BG 10, and other non-ionic surfactants.

Such other non-ionics may be fatty alcoholpolyglycolether (known under the brandname Genapol PF 20 and Genapol PN 30).

Another type of such non-ionics is an ethoxylated nonylphenol with preferably 7 ethoxylic groups in the molecule (known under the brandname Lutensol AP 7).

A substance which increases the thixotropy is added to prevent running of the compound on vertical surfaces or a dispersal on horizontal surfaces and to permit the use of layers of greater thickness. Preferably, such a substance is used in a concentration of 0.05–0.8 weight % of total mass. Substances which may be used are for example silicone emulsions, anti-foam SRE, and calcium or aluminum stearates.

The composition according to the invention is preferably prepared as a two-component system, one component being the alkali metal silicate solution, possibly containing the above-described additives, while the second component consists of the alkali metal trisilicate powder which may also contain the required additives. Prior to application as a fire-protective coating, the two components are admixed. The resulting compound is then applied in layers of preferably 2–3 mm thickness, each of which is permitted to dry after application. After the application of the fire protective coating or coatings, it is suitable to apply an air and water-resistant as well as alkali-resistant final protective coating, for example an epoxy-based material. However, other coatings, for example metal foils, especially aluminum foil, may also be applied to the fireproof coating according to the invention.

Tests have shown that the addition of materials such as perlite or talcum, as described in the aforementioned U.S. Pat. No. 3,663,355 reduces the fire-protective properties of the compound according to the present invention.

The present invention will now be described with the aid of a number of illustrative and preferred but non-limiting examples.

DESCRIPTION OF ILLUSTRATIVE EXAMPLES

EXAMPLE 1 ( Prior Art Example)

In order to provide a basis for comparison with the compound of the invention, there was prepared a mixture according to the prescription of U.S. Pat. No. 4,179,535. This mixture consisted of 50 weight % of sodium silicate solution 37/40°Bé and 50 weight % of sodium trisilicate powder (water content 17.5 weight % and a molar ratio $SiO_2:Na_2O=3.3$). This compound was applied to a horizontal wooden board having a dimension of $10\times15$ cm. When the wooden plate was then placed vertically, the coating ran off the plate.

EXAMPLE 2 (Prior Art Example)

A second prior art example was prepared according to the recipe of U.S. Pat. No. 4,179,535 and consisted of a mixture of 50 weight % of sodium silicate solution 40/42°Bé and 50 weight % of sodium silicate powder (molar ratio $SiO_2:Na_2O=3.3$ and a water content of 17.5 weight %). The consistency of this mixture did not permit its application to a horizontal wooden board and thus could not be used at all.

EXAMPLE 3

To a compound prepared in the same manner as described in Example 1 was added 0.5 weight % of aluminum stearate. This mixture consisted of 49.5 weight % of a sodium silicate solution 37/40°Bé, 50.0 weight % of a sodium trisilicate having a molar ratio $SiO_2:Na_2O=3.3$, a water content of 17.5 weight % and 0.5 weight % of aluminum stearate.

After a horizontal wooden board had been coated with the above compound, the board was placed vertically and the compound remained in place without running off.

EXAMPLE 4

A mixture prepared according to Example 2 above was augmented with the addition of 0.1 weight % of a tenside, in particular Triton BG10 and 0.2 weight % of the anti-foam emulsion SRE. The mixture thus consisted of 49.7% sodium silicate solution 40/42°Bé, 50.0 weight % of sodium trisilicate powder, 0.1 weight % of Triton BG10 and 0.2 weight % of anti-foam emulsion SRE.

Twenty five minutes after preparation, this mixture was usable, i.e., it could be applied without difficulty to a horizontal wooden board and did not run off after being placed vertically.

The foregoing description and examples relate to merely preferred embodiments of the invention and other variants and embodiments are possible without departing from the spirit and scope of the invention.

I claim:

1. A method for protecting a flammable substrate from fire damage, comprising:
   applying to said substrate a layer of a coating composition based on an alkali metal silicate binder, said binder comprising an alkali metal silicate solution containing a water glass-soluble, non-ionic surfactant in solution and further comprising an alkali metal trisilicate powder.

2. A method according to claim 1, wherein said alkali metal silicate solution contains $Me_2O$ and $SiO_2$ in the ratio 1:2.8–3.5.

3. A method according to claim 1 wherein said alkali metal silicate solution is a sodium silicate solution.

4. A method according to claim 1, wherein said alkali metal silicate solution is a mixture of a sodium silicate solution and potassium silicate solution.

5. A method according to claim 1, wherein said composition further comprises at least one of the substances from the class consisting of urea, hexamethylene tetramine, borax, dicyandiamide, and sugar, in a concentration in the range from 0.5–7 weight %.

6. A method according to claim 1, wherein said alkali metal trisilicate powder is sodium trisilicate and the concentration ratio of $Me_2O:SiO_2$ is in the range 1:2.8–3.5.

7. A method according to claim 1, wherein said alkali metal silicate solution contains alkali trisilicate powder in a concentration of between 25 and 70 weight %.

8. A method according to claim 1, wherein said alkali metal silicate solution contains alkali trisilicate powder in a concentration of between 40 and 60 weight %.

9. A method according to claim 1, wherein said composition further comprises an agent for increasing the thixotropy of said composition.

10. A method according to claim 9, wherein said surfactant and said agent which increases thixotropy are present as 0.05–0.8 weight % of the total mass.

11. A method according to claim 1, wherein said composition is prepared as a two-component system, one of said components being an alkali metal silicate solution and the other of said two components being the alkali metal trisilicate powder, at least one of said two components containing said surfactant, and in which the two components are admixed prior to application to said substrate.

12. A fire-protective coating composition for use in the method of claim 11, which is provided as a two-component system, one of said components being an alkali metal silicate solution and the other of said two components being the alkali metal trisilicate powder, at least one of said two components containing said surfactant.

13. A substrate for architectural use rendered protected from fire damage comprising a flammable substrate having thereon a coating of a coating composition based on an alkali metal silicate binder, said binder comprising an alkali metal silicate solution containing a water glass-soluble, non-ionic surfactant in solution and further comprising an alkali metal trisilicate powder.

14. A substrate according to claim 13, wherein said alkali metal silicate solution contains $Me_2O$ and $SiO_2$ in the ratio 1:2.8–3.5.

15. A substrate according to claim 13, wherein said alkali metal silicate solution is a sodium silicate solution.

16. A substrate according to claim 13, wherein said alkali metal trisilicate solution is a mixture of a sodium silicate solution and potassium silicate solution.

17. A substrate according to claim 13, wherein said coating composition further comprises at least one of the substances from the class consisting of urea, hexamethylene tetramine, borax, dicyanamide, and sugar, in a concentration in the range from 0.5–7 weight %.

18. A substrate according to claim 13, wherein said alkali metal trisilicate powder is sodium silicate and the concentration ratio of $Me_2O:SiO_2$ is in the range 1:2.8–3.5.

19. A substrate according to claim 13, wherein said alkali metal silicate solution contains alkali metal trisilicate powder in a concentration of between 25 and 70 weight %.

20. A substrate according to claim 13, wherein said alkali metal silicate solution contains alkali metal trisilicate powder in a concentration of between 40 and 60 weight %.

21. A substrate according to claim 13, wherein said coating composition further comprises an agent for increasing the thixotropy of said composition.

22. A substrate according to claim 21, wherein said surfactant and said agent which increases thixotropy are present as 0.05–0.8 weight % of the total mass.

23. A substrate according to claim 13, wherein said coating composition is prepared as two separate components, one of said components being an alkali metal silicate solution and the other of said two components being alkali metal trisilicate powder, at least one of said two components being provided with said surfactant.

24. A protected substrate in accordance with claim 13, wherein said substrate is wood.

25. A method according to claim 1, wherein said substrate is wood.

* * * * *